United States Patent [19]

Young

[11] 4,372,706
[45] Feb. 8, 1983

[54] EMERGENCY CABLE GRIPPER

[75] Inventor: Kenneth E. Young, Houston, Tex.

[73] Assignee: Exxon Production Research Co., Houston, Tex.

[21] Appl. No.: 194,514

[22] Filed: Oct. 6, 1980

[51] Int. Cl.³ .................... B65H 59/16; E02B 17/00
[52] U.S. Cl. ................... 405/195; 188/65.1; 405/224
[58] Field of Search ............ 405/195, 202, 224; 24/136 R, 136 B, 136 L; 188/65.1, 65.2, 65.3; 114/264

[56] References Cited

U.S. PATENT DOCUMENTS

| | | | |
|---|---|---|---|
| 1,218,138 | 3/1917 | Wachter | 24/136 B |
| 1,738,215 | 12/1929 | Thurston et al. | 188/65.1 X |
| 2,550,839 | 5/1951 | Martin | 188/65.1 X |
| 2,905,274 | 9/1959 | Cook | 188/65.1 |
| 2,945,563 | 7/1960 | O'Hara | 188/65.1 |
| 3,335,469 | 8/1967 | Shand et al. | 188/65.1 X |
| 3,563,042 | 2/1971 | Ryan | 405/202 |
| 4,248,549 | 2/1981 | Czerewaty | 405/195 X |

OTHER PUBLICATIONS

"Advanced Offshore Oil Platforms", *Scientific American*, vol. 246, No. 4, Apr. 1982.
"Cable Grip Equipment", Lucker Manufacturing Company, Bulletin No. 440.
"New Tower for Deep Waters", The Lamp-an Exxon publication, vol. 62, No. 3, Fall 1980.

*Primary Examiner*—David H. Corbin
*Attorney, Agent, or Firm*—E. T. Wheelock

[57] ABSTRACT

An apparatus to prevent the accidental release of a wire rope used, for instance, as an underwater guy wire on a guyed tower. The apparatus has a clamp attached to the wire rope which, when the rope is released, hits a stopping ram which presses into wedge-shaped rope grippers. The wedges squeeze the rope and stop against wedge blocks which are attached to an inside portion of the guyed tower.

12 Claims, 3 Drawing Figures

EMERGENCY CABLE GRIPPER

BACKGROUND OF THE INVENTION

1. Object of the Invention

This invention relates to an emergency cable gripper suitable for preventing the loss of guys or cables on a guyed offshore petroleum drilling or production structure. More particularly, the invention relates to a novel apparatus employing wedges to grip the cable and hold it stopped in its protective tube. A cable clamp and stopping ram are used to automatically actuate the gripping wedges in case of an accident. The apparatus is operable under water.

2. Field of the Invention

The ever more difficult search for petroleum has led to exploration in areas previously thought by many to be incapable of producing oil at economically feasible prices. The rising price of petroleum has made acceptable the costs associated with production in Alaska and the North Sea, as well as in the near-offshore areas of North America. Petroleum exploration and production in each of these areas has created problems, both esoteric and mundane, which must be solved. This invention is concerned with the solution of a potential safety problem on an offshore structure.

One of the many structures used in offshore drilling and production is one known as the "guyed tower". Simply stated, it is a space frame construction which may stand in 1500 feet or more of water, is footed in the seabed, and has a deck above the water level. Drilling and production equipment, sleeping quarters, helicopter landing pads, etc. are positioned on the deck. It is denominated a "guyed" tower because of the guylines which hold it upright and relatively immobile. A generalized discussion of guyed towers is found in U.S. Pat. No. 3,903,705, to Beck et al. Guylines on guyed towers are often "held off" at or near the deck by clamps. A guyline, as it passes down from the deck, ideally is channelled through either a leg of the structure or a guyline protection tube (which may be oil-filled) and in either event exits the structure below the water surface through an apparatus known as a "fairlead". Fairleads have the function of directing the guyline in the direction of the anchoring means. The anchoring means exemplarily comprise a clump weight of up to 100 tons or more and is in turn connected to two anchors in series. An anchor pendant and anchor buoy often are used to indicate the position of the anchors.

The instant invention relates specifically to the solution of a safety problem on a guyed tower although the invention apparatus has a broader application to any apparatus having guy wires.

It is not difficult to appreciate the desirability of protecting the guylines from accidental loss. If the guylines are dropped from the deck's surface as the result of a fire or mishandling of the clamps, the structure could shift, bringing drilling and production operations into jeopardy, or, in a natural catastrophe such as a hurricane, topple the structure.

Several methods of gripping wire cable or rope are shown. A number of those methods are said to be suitable for emergency gripping service.

A cable locking device to be used in a passenger safety belt apparatus is disclosed in U.S. Pat. No. 3,147,527, to Gilmore. The locking device utilizes a deformable conical ferrule crimped to the cable at some desired point along the cable length. A quick but powerful jerk on the cable is needed to move the crimped ferrule and the cable into the larger end of a tapered serrated sleeve mounted, in turn, inside the mouth of a larger housing. The ferrule deforms and is squeezed in a permanent grip between the serrated sleeve and the cable. The cable gripping wedges of the instant invention are not substantially deformable, are designed to be reusable, and easily disengaged from the cable.

The invention described in U.S. Pat. No. 3,467,224, to Curtis et al, is a hydraulically operated device used for gripping an oil derrick "cat line" in an emergency. The apparatus uses two approximately wedge-shaped members which are activated either manually by a human operator on the drilling deck or automatically by a mechanism which detects a broken cable whipping to-and-fro. This apparatus does not utilize the weight of the cable to self-activate as does the device of the present invention.

Another device suitable for catching a broken wire cable is shown in U.S. Pat. No. 3,779,347, to Chevalier. The cable catcher uses a pair of wedges placed in series to squeeze the cable against a stationary braking shoe. The device allows the cable to move freely in one direction and relies on friction with the cable to prevent any movement in the other direction. In contrast, the device disclosed herein does not rely on constant contact with the cables, with the attendant probability of wear, to actuate the gripping mechanism.

A cable-anchoring mechanism described in U.S. Pat. No. 3,952,377, to Morell, utilizes a conical wedge permanently attached to a wire cable. The wedge, in turn, fits inside a fixed sleeve. The device is said to be useful as an anchor for concrete-reinforcing tendons. The wire cable must always carry the fixed conical wedge thereby limiting the motility of the wedge and causing additional stress on the wire cable.

Another cable gripping device using conical wedges is shown in U.S. Pat. No. 4,078,277. The conical wedges are split down the middle and have grooves suitable for engaging the twist of the wire cable. The two wedges contiguously fit within a cone-shaped sleeve. The wedge-sleeve assembly is inserted in a suitably sized orifice and maintained under tension. Slackening of the wire cable will cause disassembly of the clamp.

SUMMARY

The instant invention provides a simple yet sturdy and reliable device, usable underwater, which is self-actuated only when it is needed.

Only the cable itself, via a tightly attached clamp, is able to actuate the cable grippers after moving a preset distance. The device can be installed in existing structures and does not introduce any additional friction points to wear or fray the cable. The cable gripper, once actuated, is easily restored to a "ready" position by the mere installation of a set of inexpensive shear pins. It has, unlike apparatus of the prior art, no permanently deformable parts nor does it disassemble itself when the cable is slackened.

Broadly speaking, the invention comprises a set of wedges which squeezes the cable by contact with a set of inclined blocks. The wedges are actuated by a clamp attached to the cable and utilize the cable's weight to and arrest its movement.

DESCRIPTION OF THE PREFERRED EMBODIMENTS

Figure 1:
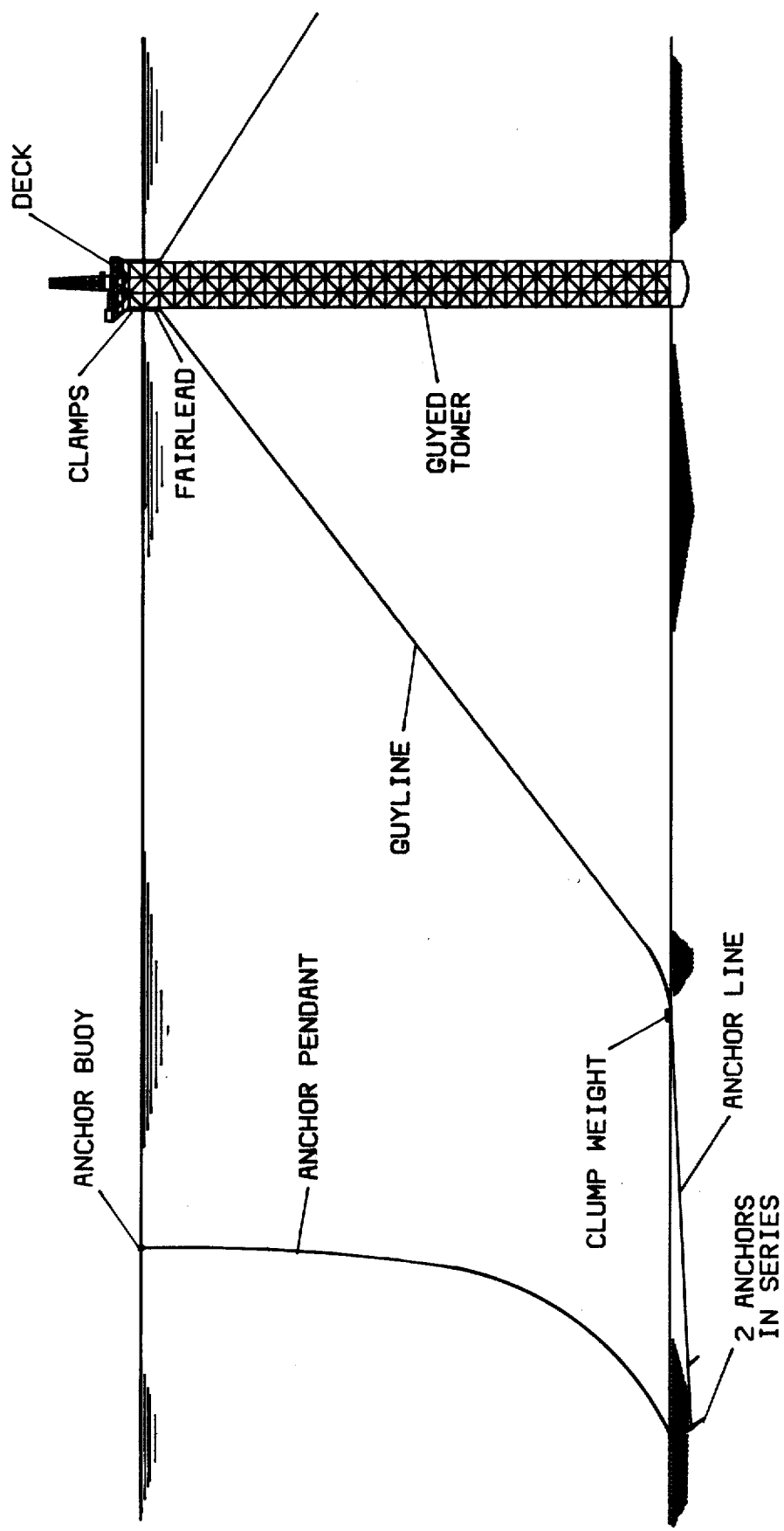
FIG. 1 provides a general diagram of a guyed tower and the manner in which it is deployed during use.

FIG. 1 shows a typical guyed tower as it would be set up for petroleum drilling offshore. The guyed tower, having a deck for drilling, heliport, drilling equipment, etc., is set in the seabed and held upright by a number of guylines. Each of the guylines is clamped at the deck, proceeds through a fairlead below the water's surface, and attaches to a clump weight which may weigh up to 200 tons or more. The clump weights, also discussed in U.S. Pat. No. 3,093,705, supra, are often articulated devices which are longer in the direction radial to the tower than they are wide. A set of anchors to provide additional assurance of tower immobility is often placed in series with the clumpweight.

Figure 2:
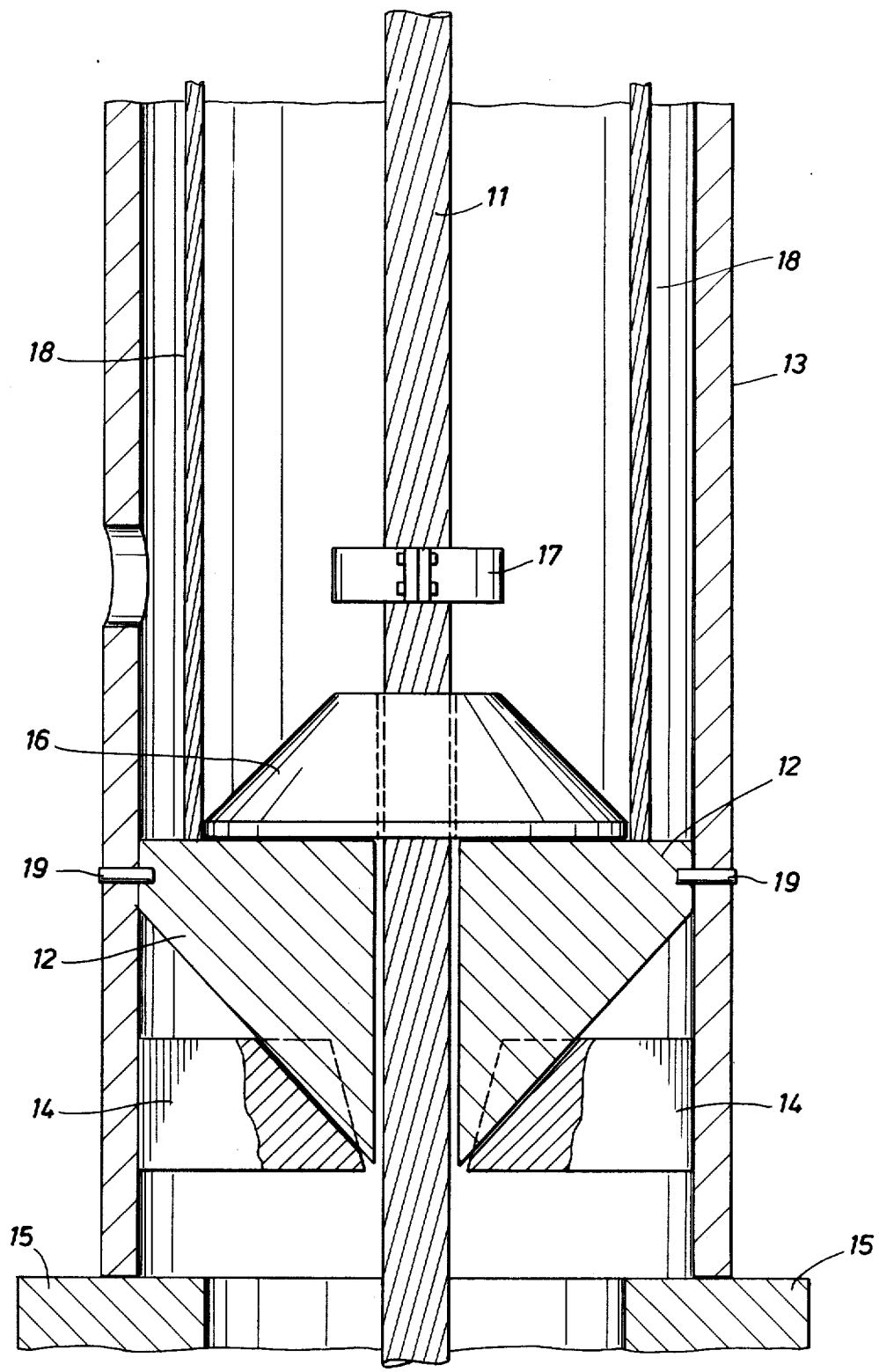
FIG. 2 is a schematic cross sectional representation of the invention.

The preferred apparatus is schematically depicted in FIG. 2 as it would be used on an offshore petroleum drilling platform. Typical existing portions of the platform are the wire rope 11 used as a guyline, the guyline protection tube 13, and the fairlead 15. A guyline protection tube is a tube surrounding the guywire as it comes off the deck and extending to some distance below the water's surface. The tube is intended to protect the guyline both from corrosion in the surface splash zone and from contact with boats and floating debris. The guyline protection tube may be filled partially with a protective oil. Other offshore structure designs place the upper guyline within a leg of the guyed tower instead of within a protection tube. It is intended that any discussion of the term "guyline protection tube" with regard to this invention be understood to include the tubing or pipe used as a guyed tower leg. The generic term "guyline protection means" is intended to include guyline protection tubes, offshore structure legs, and other implements which are capable of supporting or restraining a wire cable or rope used in tension; e.g., an antenna guy wire, that will support the wedge blocks of the invention.

A cable clamp 17 is attached to the wire rope 11 at some predetermined distance above the upper surface of the gripping wedges. For purposes of illustration, the terms "upper" and "lower" are used in the text; however, the invention may be used in any position; i.e. with the wedges pointing up, down, or horizontally. The clamp 17 may be of any known design as long as it is strong enough to momentarily support the cable during the short time it takes to break the shear pins 19 supporting the gripping wedges 12, allow the gripping wedges 12 to slide down the wedge blocks 14, and thereafter grip cable 11. Although the clamp 17 may be permanently attached to the cable, e.g., by crimping, the more desirable method entails the use of a detachable clamp since cables stretch and subsea anchoring points occasionally have to be re-set.

Stopping ram 16 hangs lossely about wire cable 11 below the cable clamp 17 and above the gripping wedges 12. The ram 16 is desirably annular-shaped with an inner diameter large enough to allow free passage of the cable 11 but small enough to prevent the passage of cable clamp 17. The ram 16 may be of any convenient shape but should have a hole therethrough. The lower surface of the ram 16 is of sufficient area to meet the gripping wedges 12 and allow an effective transfer of force from cable clamp 17 to gripping wedges 12. The bottom surface of ram 16 should not be substantially smaller than the upper surface of gripping wedges 12 since twisting or rotation of the gripping wedges 12 about shear pins 19 may occur. The bottom surface of the ram 16 may be of any suitable configuration which allows the gripping wedges to slide radially inward after contact with the ram. The bottom surface may be flat, have a slight angle (sloping downward from the center of the ram), or, in certain circumstances be grooved to engage mating grooves on top of the gripping wedges. Shear pins, in general, perform their function best when encountering only shear loads. Depending upon the particular installation, some restructuring of the periphery of ram 16 need be made if the ram 16 would interfere with the operation of wedge reset means 18 or vice versa. The wedge reset means are preferably mounted in the gripping wedges 12 outside the periphery of the ram 16.

The gripping wedges 12 are attached at their widest ends to the guyline protection tube 13 by shear pins 19, which support the wedges and hold them away from wire rope 11. As will be discussed later, the shear pins alternately may be mounted at the upper ends of wedge reset means 18 and the gripping wedge 12 held loosely in position away from wire cable 11 by, e.g., spring clips, in wedge blocks 14. Although only two wedges are illustrated in FIG. 2, a larger number may be utilized. When multiple wedges are used, the width of the cable gripping surface limits use of the invention to larger size wire ropes. The upper surface of the gripping wedges may, like the lower surface of the stopping ram 16, be of any configuration allowing ready inward movement of the gripping wedges during the wire rope gripping period. The rope gripping surface of the gripping wedges has a surface configuration suitable for performing its function of holding the wire rope in place during the emergency. The particular surface configuration is not overly critical and may be rough, smooth, flat, concave or adapted to match the left- or right-handed twist of the cable. The wedge reset means 18 are attached to the upper surface of the gripping wedges, preferably outside the perimeter of the stopping ram 16. The wedge reset means 18 are, desirably, rods which extend up to the deck of the offshore drilling structure for manual manipulation by an operator. The wedge reset means are used to reset the gripping wedges after their use in an accident. The face of the gripping wedges that slopes inwardly fits in a slot or other means in wedge blocks 14. The slot is of sufficient size to smoothly direct the gripping wedges 12 onto wire rope 11.

The wedge blocks 14 are fixed to the inside of the guywire protection tube 13 and transfer the weight of the suspended cable from the gripping wedges to the guywire protection tube 13 and thence to the fairlead 15. The face of the wedge blocks toward the gripping wedges, as mentioned above, was a slot or other opening suitable for engaging the lower sloping edge of the gripping wedges. The slots may contain spring means capable of holding the gripping wedges away from the wire cable 11.

Installation and use of the invention, for instance, in a guyline protection tube is quite simple. Prior to installation of a wire rope guywire 1 in its protection tube 13, the wedge blocks 14 are attached to the inside of the protection tube, the gripping wedges 12 are placed into position within the wedge blocks, and the shear pins 19 installed through protection tube 13 to hold the gripping wedges in place. The wedge reset rods 18 are connected to the gripping wedges. The stopping ram 16 is set in place atop the gripping wedges. The wire rope 11 is then fed up through the open space between the gripping wedges 19, through the center of stopping ram 16, and then secured in normal fashion on the deck. A diver then sets the cable clamp 17 on the wire rope guyline using, e.g., a hydraulic wrench, through holes in the protection tube 13.

If the wire rope 11 is dropped or otherwise lost from the deck and during an accident begins to fall, clamp 17 descends to contact stopping ram 16 which in turn forces the gripping wedges 12 downward, breaking the shear pins 19, and inward, gripping and saving wire rope 11.

After the loose guyline is captured at the deck surface, the wire rope 11 guyline may be pulled upward. The gripping wedges 12 should readily allow upward movement of the wire rope. On occasion, it may be necessary to simultaneously pull the wedge reset rods 18 and the wire cable 11 to free the wire cable for upward movement. In any event, after the guy is resecured in its proper position on the structure's deck, the wedge reset rods 18 are used to pull the gripping wedges back into a "ready" position. A new set of shear pins 19 is installed by a diver. The device is again ready for use.

Figure 3:
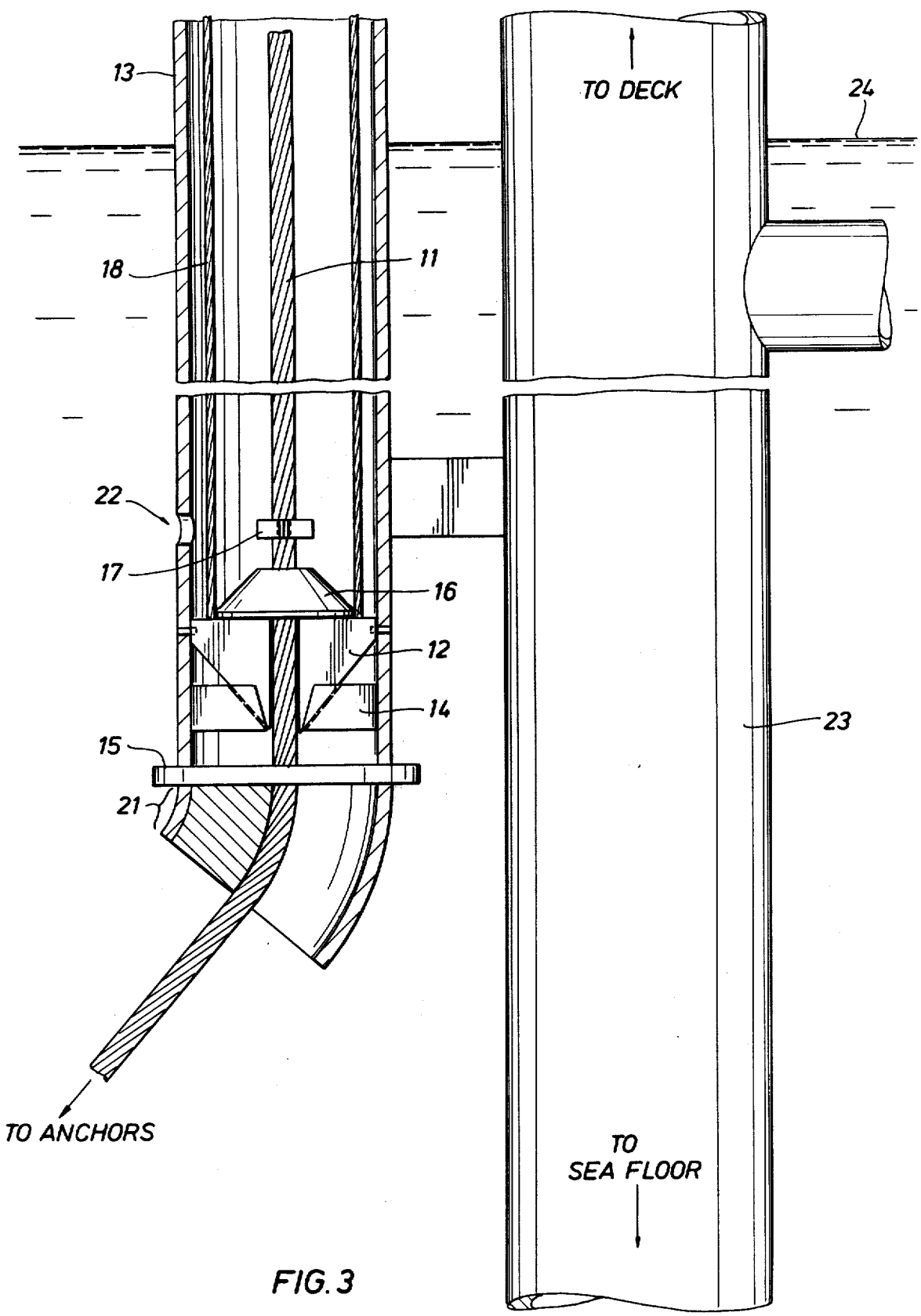
FIG. 3 shows a typical placement of the invention in a guyed tower.

FIG. 3 depicts an installation of the inventive device within a guyline protection tube 13 positioned above a fairlead 21. The clamp 17 can be set by a diver through hole 22. The adjacent platform leg is shown at 23 as is the water's surface 24.

The foregoing disclosure and description of the invention are only illustrative and explanatory thereof. Various changes in size, shape, materials of construction and configuration as well as in the details of the illustrated construction may be made within the scope of the appended claims without departing from the spirit of the invention.

I claim:

1. A safety device comprising:
   a wire rope, and
   guyline protection means having an inside surface capable of supporting the wire rope, and
   wedge means detachably supported on the inside surface of the guyline protection means, having a wire rope gripping face adjacent to but separate from the wire rope, and having an impact face adjacent to but separate from a stopping ram, and having an inclined face adjacent to but separate from wedge blocks, and
   said wedge blocks mounted fixedly on the inside surface of the guyline protection means, and having an inclined surface adjacent to but separate from the wedge means, and
   a stopping ram positioned around the wire rope, but between the wedge means and a clamp and
   a clamp fixed to the wire rope at a predetermined distance from the surface of the wedge means, and having sufficient strength and size to activate the proximate stopping ram.

2. The device of claim 1 wherein the wedge means comprise two or more wedges mounted in the guyline protection means.

3. The device of claim 1 wherein the guyline protection means comprise a guyline protection tube.

4. The device of claim 1 wherein the guyline protection means comprise the leg of an offshore guyed tower.

5. The device of claim 1 wherein the wedge means are supported by shear pins mounted through the guyline protection means.

6. A safety device comprising:
   a wire rope, and
   guyline protection means having an inside surface capable of supporting the wire rope, and
   wedge means detachably supported on the inside surface of the guyline protection means, having a wire rope gripping face adjacent to but separate from the wire rope, and having an impact face adjacent to but separate from a stopping ram, and having an inclined face adjacent to but separate from wedge blocks, and
   said wedge blocks mounted fixedly on the inside surface of the guyline protection means, and having an inclined surface adjacent to but separate from the wedge means, and
   a stopping ram positioned around the wire rope, but between the wedge means and a clamp, and
   a clamp fixed to the wire rope at a predetermined distance from the surface of the wedge means, and having sufficient strength and size to activate the proximate stopping ram and
   wedge reset means suitable for retracting the wedge means from gripping contact with the wire rope.

7. The device of claim 6 wherein the wedge means comprise two or more wedges mounted in the guyline protection means.

8. The device of claim 6 wherein the guyline protection means comprise a guyline protection tube.

9. The device of claim 6 wherein the guyline protection means comprise the leg of an offshore guyed tower.

10. The device of claim 6 wherein the wedge reset means are rods.

11. The device of claim 6 wherein the wedge reset means are cables.

12. The device of claim 6 wherein the wedge means are supported by shear pins mounted through the guyline protection means.

* * * * *